(12) United States Patent
Krohn et al.

(10) Patent No.: US 10,428,974 B2
(45) Date of Patent: Oct. 1, 2019

(54) SYSTEM FOR ROUTING AND SECURING ELONGATE ROUTED COMPONENTS OF A VEHICLE

(71) Applicant: CNH Industrial America LLC, New Holland, PA (US)

(72) Inventors: Martin L. Krohn, DeGraff, MN (US); Stephen Stuhr, Willmar, MN (US)

(73) Assignee: CNH Industrial America LLC, New Holland, PA (US)

( * ) Notice: Subject to any disclaimer, the term of this patent is extended or adjusted under 35 U.S.C. 154(b) by 5 days.

(21) Appl. No.: 15/497,946

(22) Filed: Apr. 26, 2017

(65) Prior Publication Data

US 2017/0314705 A1   Nov. 2, 2017

Related U.S. Application Data

(60) Provisional application No. 62/328,750, filed on Apr. 28, 2016.

(51) Int. Cl.
| | |
|---|---|
| *F16L 3/02* | (2006.01) |
| *F16M 13/02* | (2006.01) |
| *B60R 16/02* | (2006.01) |
| *F16L 3/237* | (2006.01) |
| *F16L 3/123* | (2006.01) |
| *F16L 3/06* | (2006.01) |

(Continued)

(52) U.S. Cl.
CPC ............ *F16L 3/02* (2013.01); *B60R 16/0215* (2013.01); *F16L 3/06* (2013.01); *F16L 3/1233* (2013.01); *F16L 3/2235* (2013.01); *F16L 3/237* (2013.01); *F16M 13/02* (2013.01); *A47B 2210/007* (2013.01); *A47B 2210/0081* (2013.01); *H02G 3/32* (2013.01)

(58) Field of Classification Search
CPC ... F16L 3/02; F16L 3/06; F16L 3/1233; A47B 2210/007; A47B 2210/0081; B60R 16/0215; H02G 3/32
USPC ................ 248/56, 67.5, 68.1, 70, 74.1, 74.4
See application file for complete search history.

(56) References Cited

U.S. PATENT DOCUMENTS

| | | | | |
|---|---|---|---|---|
| 2,231,462 | A * | 2/1941 | Cobb ..................... | F16L 3/2235 165/162 |
| 2,843,363 | A * | 7/1958 | Mailander ............. | F16L 3/2235 165/137 |

(Continued)

FOREIGN PATENT DOCUMENTS

EP   1975491   10/2008

*Primary Examiner* — Eret C McNichols
(74) *Attorney, Agent, or Firm* — Rebecca L. Henkel; Richard K. DeMille

(57) ABSTRACT

A routing and securing system with adjacent components is provided to route and secure hoses, lines, and harnesses of vehicles in a manner that is repeatable and straightforward and can be documented. The routing and securing system uses a base block provided in a first plane and a retainer, or wrap, provided in a second plane. The base block provides concave receptacles, or slots, for seating elongate routed components in the first plane, while the retainer overlaps the elongate routed components in the second plane to secure the elongate routed components to their respective concave receptacles. A mounting bracket may be used to mount the routing and securing system to the vehicle, and may also be used to join a pair of routing and securing systems together.

18 Claims, 12 Drawing Sheets

(51) Int. Cl.
*F16L 3/223* (2006.01)
*H02G 3/32* (2006.01)

(56) References Cited

U.S. PATENT DOCUMENTS

| | | | |
|---|---|---|---|
| 4,234,012 A * | 11/1980 | Schupback | E02F 3/384 |
| | | | 137/355.17 |
| 4,715,571 A | 12/1987 | Soltow et al. | |
| 5,742,982 A | 4/1998 | Dodd et al. | |
| 6,513,765 B2 | 2/2003 | Griffin et al. | |
| 6,513,766 B1 | 2/2003 | Gretz | |
| 6,543,094 B2 | 4/2003 | D'Addario | |
| 7,806,629 B2 | 10/2010 | McCoy | |
| 8,356,778 B2 | 1/2013 | Birli et al. | |
| 8,360,371 B2 * | 1/2013 | Getts | F16L 3/01 |
| | | | 242/370 |
| 8,590,847 B2 | 11/2013 | Guthke et al. | |
| 9,469,964 B2 * | 10/2016 | Nakamura | E02F 3/302 |
| 9,502,870 B2 * | 11/2016 | Merritt | H02G 3/02 |
| 9,601,908 B2 * | 3/2017 | Merritt | H02G 3/02 |
| 9,709,091 B2 * | 7/2017 | Chen | F16C 29/12 |
| 9,856,912 B2 * | 1/2018 | Chen | F16C 29/005 |
| 2003/0173470 A1 | 9/2003 | Geiger | |
| 2005/0172459 A1 * | 8/2005 | Ryan | H02G 3/24 |
| | | | 24/115 R |
| 2006/0108481 A1 * | 5/2006 | Riedy | F16L 3/221 |
| | | | 248/68.1 |
| 2007/0246613 A1 * | 10/2007 | Kennedy | H02G 3/32 |
| | | | 248/56 |
| 2010/0001144 A1 * | 1/2010 | Lundgren | E02F 3/3654 |
| | | | 248/68.1 |
| 2013/0187012 A1 | 7/2013 | Blakeley et al. | |
| 2013/0320155 A1 * | 12/2013 | Okabe | B60K 15/01 |
| | | | 248/65 |
| 2017/0314706 A1 * | 11/2017 | Krohn | B60R 16/0215 |
| 2018/0118136 A1 * | 5/2018 | Carremm | B60R 16/0215 |

\* cited by examiner

SYSTEM FOR ROUTING AND SECURING ELONGATE ROUTED COMPONENTS OF A VEHICLE

CROSS REFERENCE TO RELATED APPLICATIONS

This is a non-provisional application based upon U.S. provisional patent application Ser. No. 62/328,750, titled "System for Routing and Securing Elongate Routed Components of an Off-Road Agricultural Vehicle," filed Apr. 28, 2016, which is incorporated herein by reference.

FIELD OF THE INVENTION

The invention relates generally to securing hydraulic hoses, wires or other elongate routed components of vehicles and, in particular, to a system for routing and securing elongate routed components of vehicles using a base block disposed in a first plane and a retainer disposed in a second plane.

BACKGROUND OF THE INVENTION

Vehicles, including self-propelled off-road agricultural vehicles, towed implements, and other towed and self-propelled vehicles are getting larger and more complex, some of which have sophisticated on-board systems and components to perform various vehicle functions. Numerous vehicle elongate routed components, such as hydraulic hoses, fuel lines, air conditioner (A/C) and heater lines, are required for operation of the systems and/or components. Moreover, bulky wire harnesses and/or wire harnesses which require routing are often required for power and signal transmission between on-board systems and/or components. Routing and securing such elongate routed components can be an important part of vehicle design in order to provide a neat appearance while offering protection for the hoses, lines, and harnesses. However, the lengths and bulk of the hoses, lines, and harnesses of large and complex off-road agricultural vehicles make them difficult to work with, which can make repeatable installation difficult and time-consuming.

SUMMARY OF THE INVENTION

A routing and securing system with adjacent components is provided to route and secure hoses, lines, and harnesses of vehicles in a manner that is repeatable and straightforward and can be documented. The routing and securing system uses a base block provided in a first plane and a retainer, or wrap, provided in a second plane. The base block provides concave receptacles, or slots, for seating elongate routed components in the first plane, while the retainer overlaps the elongate routed components in the second plane to secure the elongate routed components to their respective concave receptacles. A mounting bracket may be used to mount the routing and securing system to the vehicle, and may also be used to join a pair of routing and securing systems together.

According to one aspect of invention, the routing and securing system may be part of an under engine support for a vehicle. According to another aspect of invention, the routing and securing system may be mounted over an axle of a vehicle. Multiple routing and securing systems may be provided, in various locations of a single vehicle, such as left or right hand sides, and each routing and securing system can accommodate a varying number of elongate routed components, such as a first routing and securing system accommodating three hoses in proximity to a second routing and securing system accommodating seven hoses.

According, to another aspect of invention, presence of the retainer may allow the slot width to be wider which, in turn, may allow for a elongate routed component to be more easily installed or removed from the slot. This may make assembly significantly easier.

According to another aspect of intervention, elongate routed components may be placed in slots on oppositely situated sides of the base block. Then, arms of the wrap may secure the elongate routed components in their respective slots. If one elongate routed component applies pressure outward from the slot, such pressure will exert onto the wrap, which will further hold against the other elongate routed component in the opposing slot. Consequently, elongate routed components from one side may prevent elongate routed components from an opposite side from coming out of slots.

Specifically then, one aspect of the present invention provides a system for routing and securing elongate routed components of a vehicle such as an off-road agricultural vehicle. The system may include: a base block disposed in a first plane, the base block including an outer edge having multiple sides projecting in the first plane, in which the outer edge defines first and second concave receptacles, in which the first and second concave receptacles are configured to receive first and second elongate routed components, respectively, passing through the first plane and into a second plane adjacent to the first plane; and a retainer disposed in the second plane, the retainer having a retainer base providing an arm, in which the retainer is disposed in the second plane so that the retainer base or the arm is configured to secure the first elongate routed component to the first receptacle and the retainer base or the arm is configured to secure the second elongate routed component to the second receptacle.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
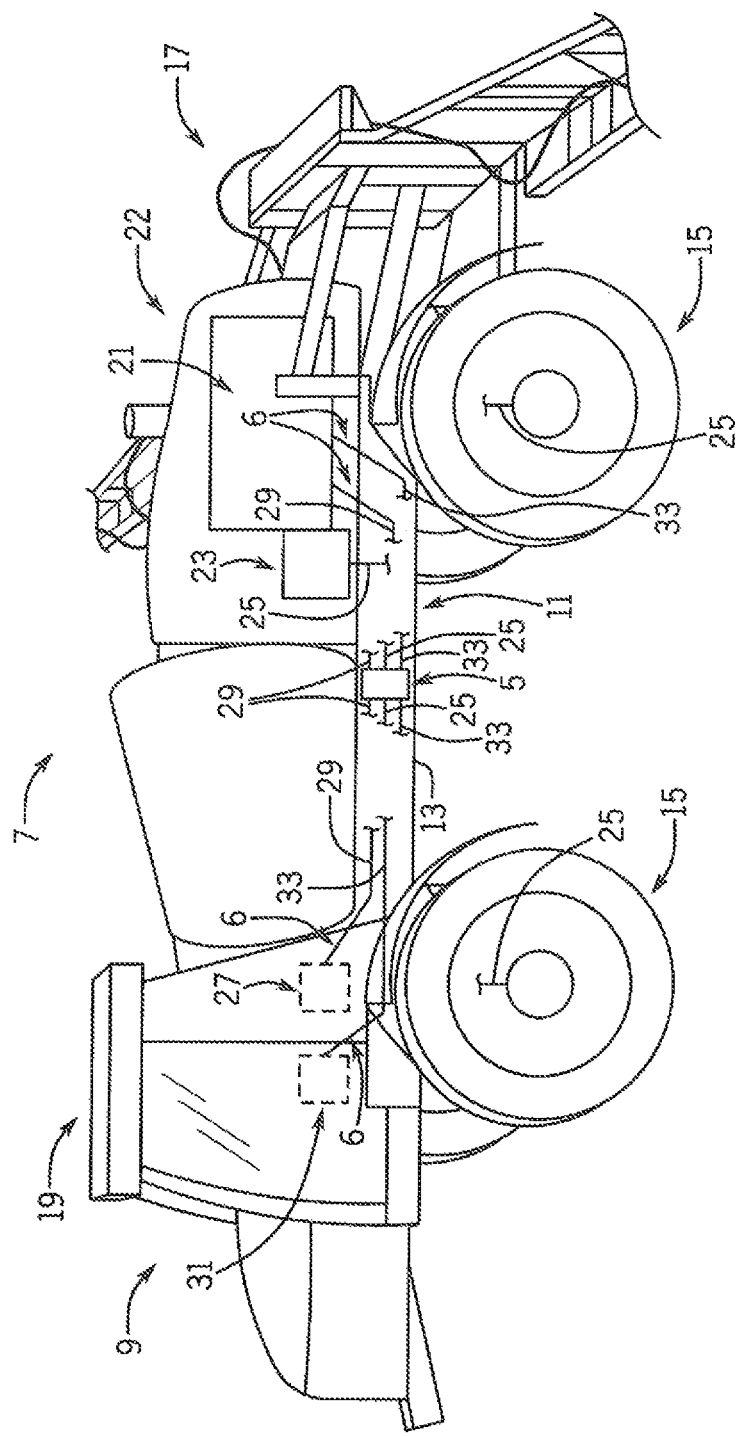
FIG. 1 is a side elevational view of a vehicle shown as an off-road agricultural vehicle with a routing and securing system according with the present invention.

Referring now to the drawings and specifically to the simplified and partially schematic representation of FIG. 1, a routing and securing system, shown as system 5 with adjacent components, is provided to route and secure elongate routed components 6 such as hoses, lines, and harnesses. System 5 is shown used with vehicle 7. Vehicle 7 is shown as an off-road agricultural vehicle 7, represented here as a self-propelled sprayer 9, such as those available from CNH Industrial as the Case IH Patriot® Series Sprayers. Although off-road agricultural vehicle 7 is shown as sprayer 9, it is understood that off-road agricultural vehicle 7 may include other self-propelled implements, tractors, or other off-road agricultural vehicles 7. It is understood that vehicle 7 may be other self-propelled vehicles and also towed implements requiring routing of elongate routed components.

Referring, again to FIG. 1, sprayer 9 includes chassis 11 having chassis frame 13 that supports wheels 15 and various other assemblies, systems, and components. These various assemblies, systems, and components include product application system 17, cab 19, and engine 21 housed in engine compartment 22 for delivering power for machine functions of sprayer 9.

Still referring to FIG. 1, hydraulic system 23 receives power from engine 19 and includes at least one hydraulic pump which may be in a hydrostat arrangement for providing hydraulic pressure for various hydraulic components of sprayer 9. For hydraulic drive implementations of sprayer 9, hydraulic system 23 provides hydraulic pressure for operating hydraulic motors that are operably connected to the hydraulic pump(s) for rotating wheels 15 for moving sprayer 9. Hydraulic hoses 25 extend as elongate routed components 6 that interconnect the various hydraulic components to each other within hydraulic system 23 and extend at least partially along chassis 11 and may extend from the engine compartment 22 toward cab 19.

Still referring to FIG. 1, electronic system 27 provides electrical power and data transmission to and between in-cab and other electronic components of sprayer 9. Electronic system 27 includes battery(ies) operably connected to an alternator(s) driven by engine 21. Electronic system 27 has various conductors for power and data transmission between components and are shown bundled together to provide wire harness(es) 29 as elongate routed components 6 that extend at least partially along chassis 11 and may extend from the engine compartment 22 toward cab 19.

Still referring to FIG. 1, HVAC (heating, ventilation, and air conditioning) system 31 is configured for controlling climate within cab 19 and includes an AC compressor driven by engine 21 and a heater core that may cooperate with a radiator of a cooling package of engine 21. HVAC lines 33, such as heater lines and/or AC lines extend as elongate routed components 6 that interconnect HVAC components to each other and extend at least partially along chassis 11, may extend from engine compartment 22 toward cab 19. It is understood that other lines such as fuel or pneumatic lines may also extend between various components of vehicle 7 that can be used with system 5.

Figure 2:
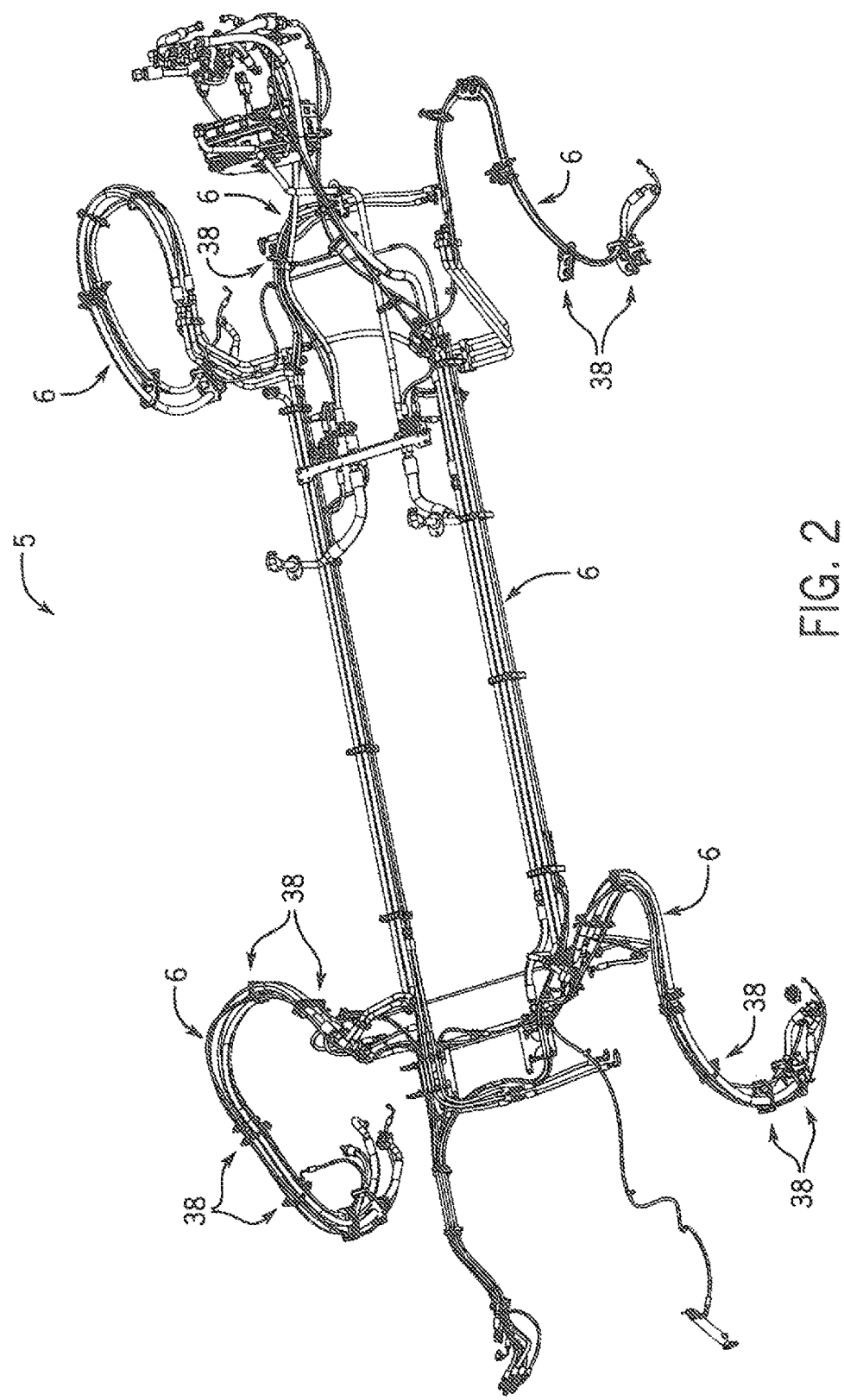
FIG. 2 is an pictorial view of various elongate routed components and routing and securing assemblies in accordance with the present invention.

Referring now to FIG. 2, various elongate routed components 6 are shown routed and secured at various locations within vehicle 7 (FIG. 1) by system 5. System 5 has at least one routing and securing arrangement or assembly and is shown here having multiple routing and securing assemblies, generally shown as assemblies 38. When system 5 has, multiple assemblies 38, the multiples assemblies 38 may be spaced from each other and may have the same or different configurations. Different configurations of assemblies 38 are represented as various different versions of assemblies shown in FIGS. 3-14, discussed in greater detail elsewhere. The configuration(s) of a particular assembly and its components is based on, for example, its location within vehicle 7 (FIG. 1) and the elongate routed components 6 being routed and secured and may also be configured based on preferred direction of insertion of the elongate routed components 6 into the assembly and/or removal or access for maintenance. Various assemblies may include or be mounted to a bracket (not all of which are shown) or otherwise connected to or supported by chassis components of vehicle 7. Or, the assemblies may be free-standing and only supported by the elongate routed components 6 that is being routed, for example, to accommodate flexing or other movement(s) of the elongate routed components 6.

Figure 3:
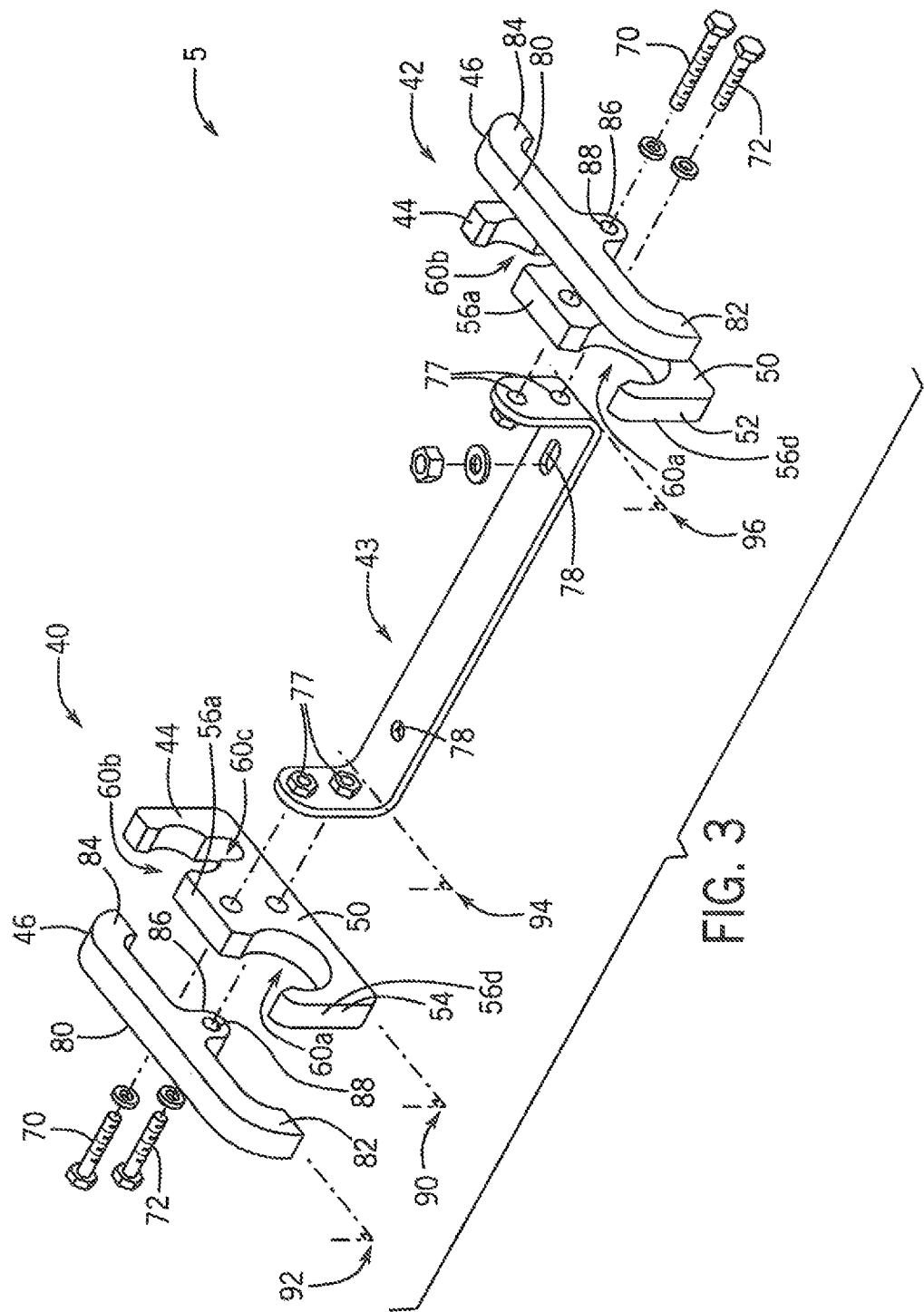
FIG. 3 is an exploded pictorial view of first and second routing and securing assemblies of FIG. 1 joined by a mounting bracket.

Referring now to FIG. 3, an exploded pictorial view of an exemplar system 5 including assemblies 38 (FIG. 2) shown here as first and second routing and securing assemblies 40 and 42, respectively, joined by a mounting bracket 43, is provided for routing and securing elongate routed components 6 (FIG. 2) of vehicle 7. Each routing and securing assembly 40, 42 may include a base block 44 and a retainer 46 (wrap). The base block 44 may be substantially disposed in a first plane 90 and the retainer 46 may be substantially disposed in a second plane 92 adjacent to the first plane 90. In preferred aspect, the retainer 46 in the second plane 92 may be substantially parallel to the base block 44 the first plane 90.

Figure 4:
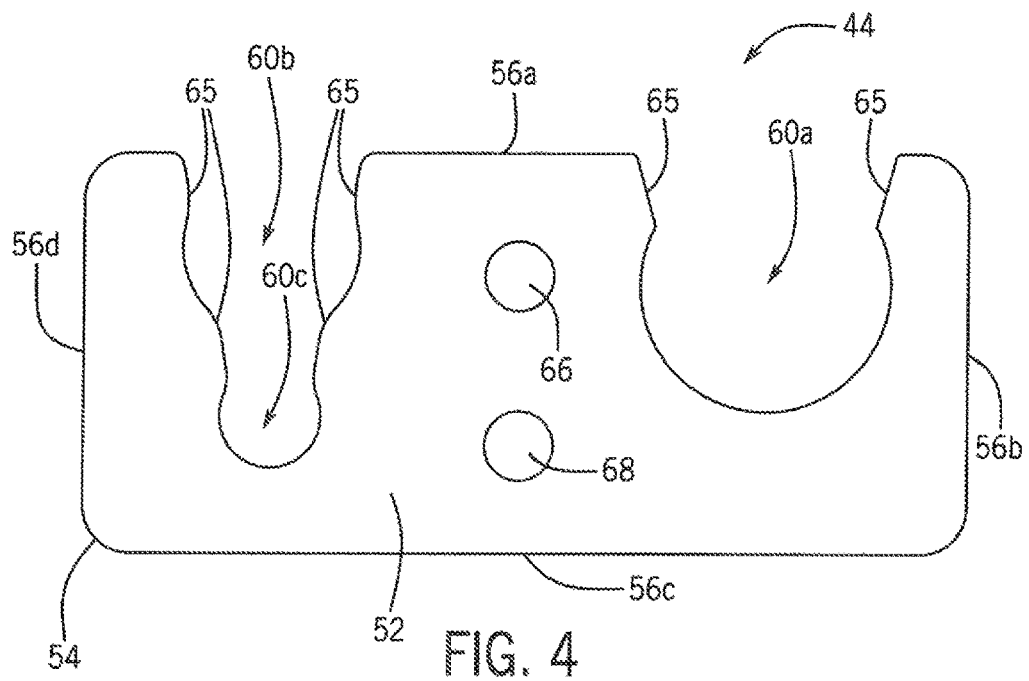
FIG. 4 is a plan view of a base block for the routing and securing assembly of FIG. 3.

With additional reference to FIG. 4, the base block 44 may include first and second opposing surfaces 50 and 52, respectively, with an outer edge 54 traveling the perimeter of the base block 46 between the first and second opposing surfaces 50 and 52, respectively. The outer edge 54 may include multiple sides 56 projecting outwardly in the first plane 90. The outer edge 54 may also define one or more concave receptacles 60 (slots), such as first and second concave receptacles 60a and 60b, respectively. The first and second concave receptacles 60a and 60b, respectively, may be configured to receive first and second elongate routed components, respectively (not shown). Such elongate routed components may be routed to pass through the first plane 90 and into the second plane 92.

In one aspect, the first and second concave receptacles 60a and 60b, respectively, may be adjacent to one another on a common side 56 defined by the outer edge 54, such as the first side 56a. In addition, in one aspect, the outer edge 54 which defines the second concave receptacle 60b may further define a third concave receptacle 60c within the second concave receptacle 60b. The third concave receptacle 60c may have a smaller dimension than the second concave receptacle 60b, such as a smaller diameter cross section, so as to accommodate a elongate routed component having a similarly smaller dimension. Accordingly, in this aspect, the base block 44 may be configured to securely route three elongate routed components of varying dimensions, each passing through the first plane 90 and into the second plane 92.

In one aspect, the outer edge 54 may urge inward at ingress regions 65 of the first, second and third concave receptacles 60a, 60b and 60c, respectively. Use of the retainer 46 may advantageously allow widths of the ingress regions 65 to be wider, which, in turn, may allow elongate routed components to be more easily installed or removed from the concave receptacles. This may make assembly significantly easier.

To provide a secure attachment in the system 5, the base block 44 may also include first and second base block apertures 66 and 68, respectively. The first base block aperture 66 may receive a first fastener 70 for joining the base block 44 to the retainer 46 and/or the mounting bracket 43. The second base block aperture 68 may receive a second fastener 72 for joining the base block 44 to the mounting bracket 43. The first and second fasteners 70 and 72, respectively, may include, for example, a bolt passing through a washer and the respective aperture with a nut receiving the bolt on the other side to firmly establish the fastening as known in the art.

In one aspect, the mounting bracket 43 may be an shaped bracket disposed in a third plane 94 adjacent to the base block 44 and bending into a fourth plane, substantially orthogonal to the third plane 94. The mounting bracket 43 may securely fasten to the base block 44 and/or the retainer 46 via first mounting apertures 77 in the third plane 94. The mounting bracket 43 may also securely fasten to an element of the vehicle 7, such as the chassis frame 13, an axle, or the like, via second mounting apertures 78 in the fourth plane.

Figure 5:
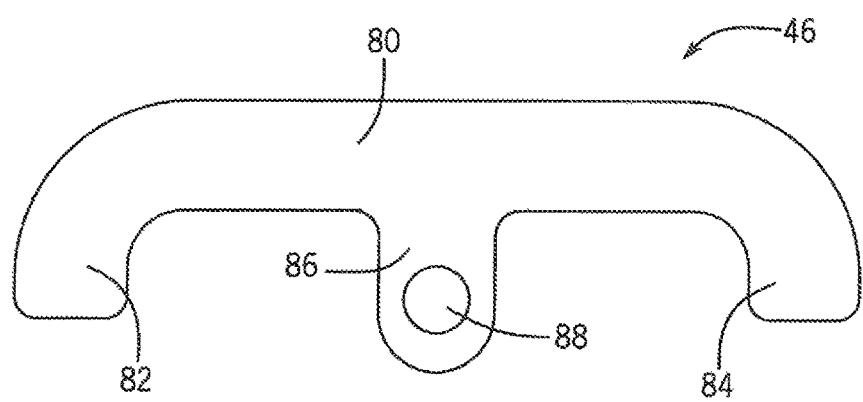
FIG. 5 is a plan view of a retainer for the routing and securing assembly of FIG. 3.

With additional reference to FIG. 5, the retainer 46 may include a retainer base 80 providing first and second arms 82 and 84, respectively, and a retainer mounting tab 86. The retainer 46 may be disposed in the second plane 92 so that the retainer base 80, the first arm 82 and/or the second arm 84 overlaps one or more elongate routed components to secure the elongate routed components to a concave receptacle 60 of the base block 144. For example, as illustrated in FIGS. 3-5, the retainer base 80 of the retainer 46 may overlap first and second elongate routed components (not shown) to secure the first and second elongate routed components to the first and second, concave receptacles 60a and 60b, respectively, of the base block 44.

To provide a secure attachment in the system 5, the base retainer 46 may also include a retainer aperture 88. The retainer aperture 88 may receive the first fastener 70 for joining the retainer 46 to the base block 44 and/or the mounting bracket 43.

In one aspect, the mounting bracket 43 may be a "U" shaped bracket as illustrated. Accordingly, the mounting bracket 43 may bend further from the fourth plane into a fifth plane 96 substantially orthogonal to the fourth plane and substantially parallel to the third plane 94. Accordingly, the mounting bracket 43 may join the first routing and securing assembly 40, via one or more fasteners through a portion of the mounting bracket 43 in the third plane 94, to the second routing and securing assembly 42, via one or more fasteners through a portion of the mounting bracket 43 in the fifth plane 96. It will be appreciated that, in another aspect, instead of the retainer 46 being arranged outwardly of the base block 44 as shown in FIG. 2, the retainer 46 could be arranged inwardly of the base block 44. Such variations are deemed within the scope of the present invention.

Figure 6:
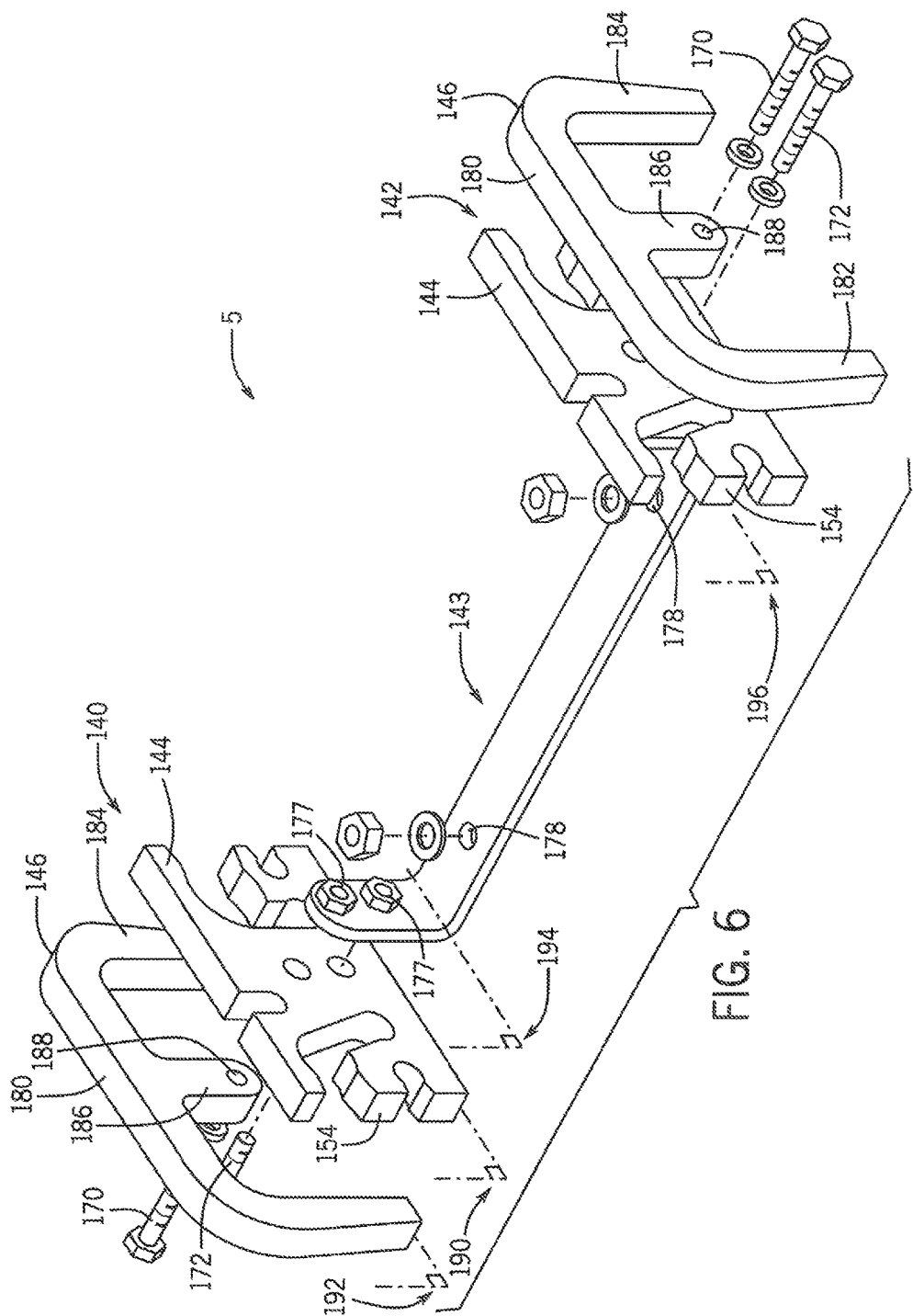
FIG. 6 is an exploded pictorial view of first and second routing and securing assemblies joined by a mounting bracket according to another aspect.

Referring now to FIG. 6, an exploded pictorial view of another exemplar system 5 now including assemblies shown as first and second routing and securing assemblies 140 and 142, respectively, joined by a mounting bracket 143, is provided for routing and securing elongate routed components of the vehicle 7 according to another aspect. For brevity, elements shown for the first and second routing and securing assemblies 140 and 142, respectively, in FIGS. 6-10, with reference numerals in the 100's, should be treated as substantially equivalent to elements shown in FIGS. 3-5, unless otherwise stated.

Figure 7:
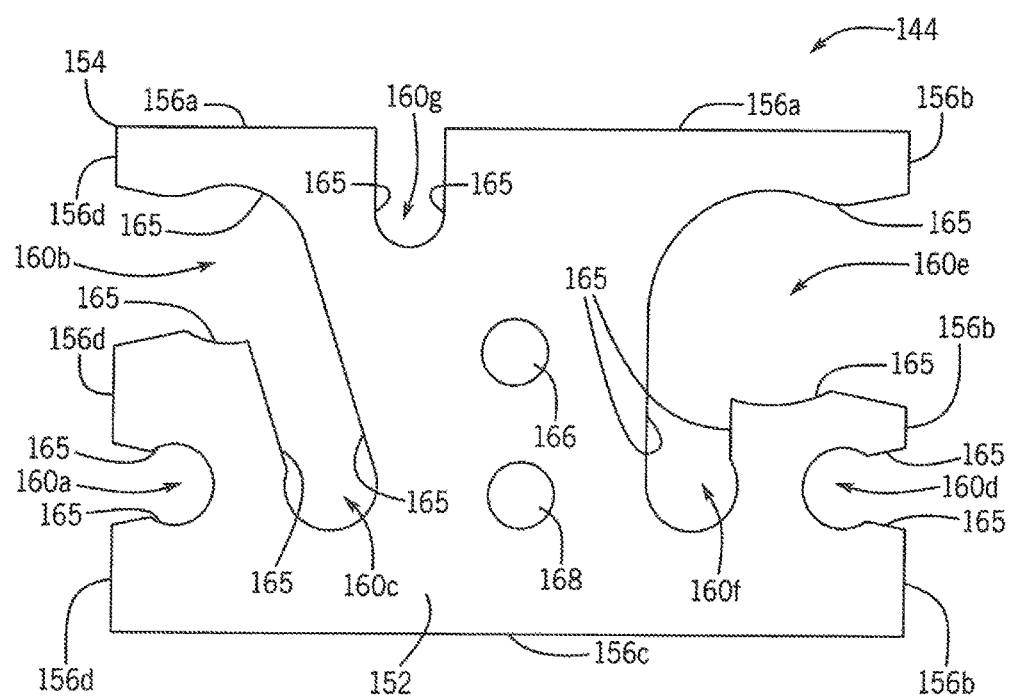
FIG. 7 is a plan view of a base block for the routing and securing assembly of FIG. 6.

In the aspect of FIG. 6, with additional reference to FIG. 7, first and second concave receptacles 160a and 160b, respectively, may also be adjacent to one another on a common side 156 defined by an outer edge 154, such as a fourth side 156d. In addition, in one aspect, the outer edge 154 which defines the second concave receptacle 160b may further define a third concave receptacle 160c within the second concave receptacle 160b. The third concave receptacle 160c may have a smaller dimension than the second concave receptacle 160b, such as a smaller diameter cross section, so as to accommodate a elongate routed component having a similarly smaller dimension.

In addition, the outer edge 154 may further define fourth and fifth concave receptacles, 160d and 160e, respectively, adjacent to one another on a side projecting oppositely from the fourth side 156d, such as the second side 156b. Also, in one aspect, the outer edge 154 which, defines the fifth concave receptacle 160e may further define a sixth concave receptacle 160f within the fifth concave receptacle 160e. The sixth concave receptacle 160f may have a smaller dimension than the fifth concave receptacle 160e, such as a smaller diameter cross section, so as to accommodate a elongate routed component having a similarly smaller dimension.

In addition, the outer edge 154 may further define seventh concave receptacle 160g on yet another side defined by the outer edge 154, such as a first side 156a. Accordingly, in this aspect, the base block 144 may be configured to securely route seven elongate routed components of varying dimensions, each passing through the first plane 190 and into the second plane 192.

Figure 8:
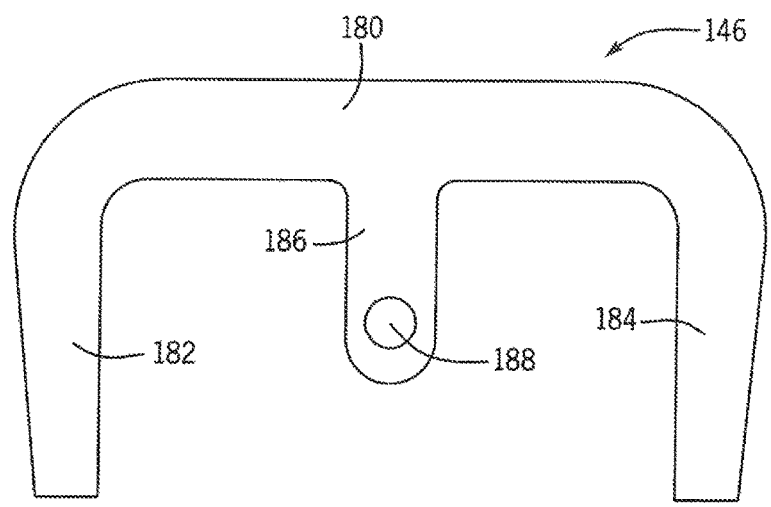
FIG. 8 is a plan view of a retainer for the routing and securing assembly of FIG. 6.

With additional reference to FIG. 8, the retainer 146 may include a retainer base 180 providing first and second arms 182 and 184, respectively, and a retainer mounting tab 186. The retainer 146 may be disposed in the second plane 192 so that the retainer base 180, the first arm 182 and/or the second arm 184 overlaps one or more elongate routed components to secure the elongate routed components to a concave receptacle 160 of the base block 144. For example, as illustrated in FIGS. 5-7, the first arm 182 of the retainer 146 may overlap first and second elongate routed components (not shown) to secure the first and second elongate routed components to the first and second concave receptacles 160a and 160b, respectively, of the base block 144. Also, the second arm 184 of the retainer 146 may overlap fourth and fifth elongate routed components (not shown) to secure the fourth and fifth elongate routed components to the fourth and fifth concave receptacles 160d and 160e, respectively, of the base block 144. Also, the retainer base 180 of the retainer 146 may overlap the seventh elongate routed component (not shown) to secure the seventh elongate routed component to the seventh concave receptacles 160 of the base block 146.

Figure 9:
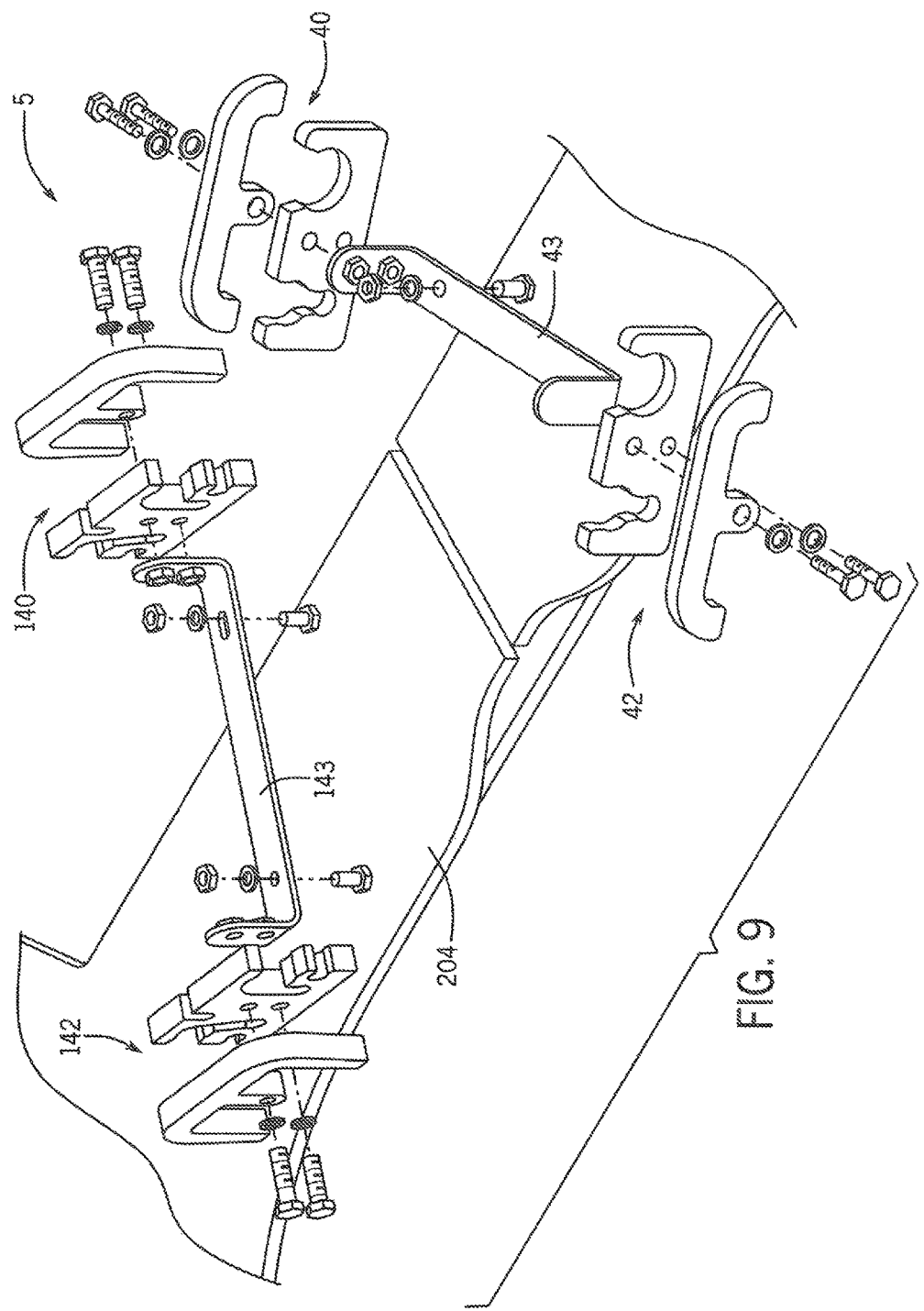
FIG. 9 is an exploded pictorial view of first and second routing and securing assemblies of FIG. 3 and first and second routing and securing assemblies of FIG. 6, each mounted to the vehicle of FIG. 1.

Referring now to FIG. 9, an exploded pictorial view of first and second routing and securing systems 40 and 42, respectively, of FIG. 3 and first and second routing and securing assemblies 140 and 142, respectively, of FIG. 6, are provided. Each of the routing and securing systems are mounted to the vehicle 7, such as at a rear axle 204 on one side of the vehicle 7.

Figure 10:
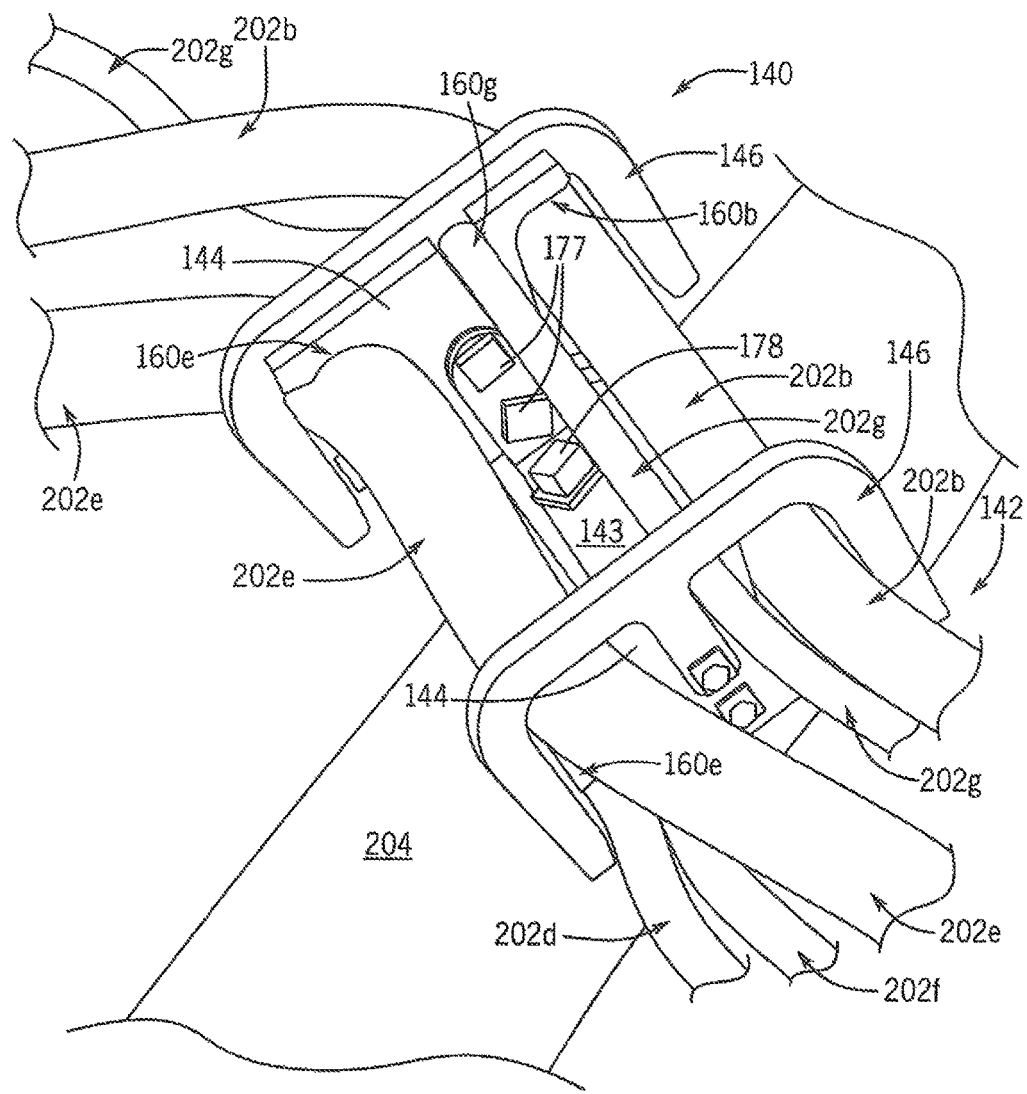
FIG. 10 is a detailed pictorial view of the routing and securing assembly of FIG. 9 with various elongate routed components of the vehicle being routed and secured.

Referring now to FIG. 10, a detailed pictorial view of the first and second routing and securing assemblies 140 and 142 of FIG. 9 is provided with various elongate routed components 202 of the vehicle 7 being routed. The mounting bracket 143 is mounted to the rear axle 204 via the second mounting apertures 178 and fasteners.

As illustrated by way of example, a retainer 146 of the first routing and securing assembly 140 secures a second elongate routed component 202b to a second concave receptacle 160b of a base block 144 of the first routing and securing system 140, then a retainer 146 of the second routing and securing assembly 142 secures the second elongate routed component 202b to a second concave receptacle 160b of a base block 144 of the second routing and securing system 142. Similarly, the retainer 146 of the first routing and securing system 140 secures a first elongate routed component 202a (not visible in FIG. 10 due to routing underneath the second elongate routed component 202b) to a second concave receptacle 160a (not visible in FIG. 10 due to placement underneath the second concave receptacle 160h) of the base block 144 of the first routing and securing system 140, then the retainer 146 of the second routing and securing system 142 secures the first elongate routed component 202a to a second concave receptacle 160a (not visible in FIG. 10 due to placement underneath the second concave receptacle 160b) of the base block 144 of the second routing and securing system 142; and so forth. In this aspect, seven elongate routed components 202 are routed and secured, though in alternative arrangements, a greater or lesser number of elongate routed components 202 could be routed and secured.

Referring generally to FIGS. 11-14, these systems 5 and their components are similar to those shown in various ones of FIGS. 3-10, whereby those descriptions are applicable here with respect to systems 5 of FIGS. 11-14. Accordingly, various common or similar surfaces and/or other features are left unlabeled in FIGS. 11-14 to simplify the descriptions of systems 5 shown in FIGS. 11-14 by mainly describing differences compared to those in FIGS. 3-10.

Figure 11:
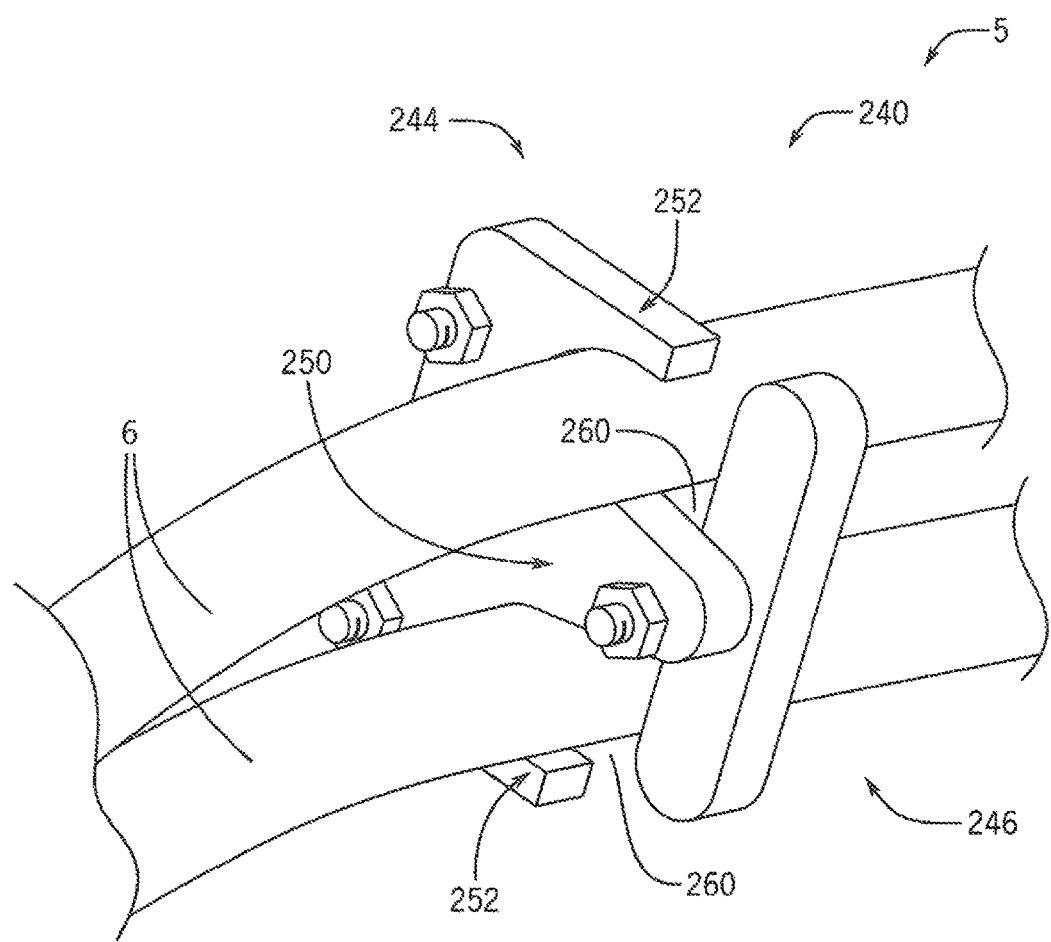
FIG. 11 is a pictorial view of another routing and securing assembly with various elongate routed components of the vehicle being routed and secured.

Referring now to FIG. 11, routing and securing assembly 240 is similar to assemblies 40, 42 shown in FIGS. 2 and 9 and their components shown in FIGS. 4-5. Base block 244 has a generally "W" shaped configuration with an intermediate leg 250 that tapers downwardly from its wider segment at a connection with the main body of base block 244 to its narrower segment at an outer end of intermediate leg 250.

Outer legs 252 extend generally parallel to and are transversely spaced from intermediate leg 250, with intermediate leg 250 extending further from the main body of base block 244 than outer legs 252. Concave receptacles 260 are defined between the intermediate and outer legs 250, 252. Concave receptacles 260 taper down from relatively wider widths of openings at their outer ends closest to retainer 246 to narrower widths toward the bottom or inner ends of the receptacles 160, deepest into base block 244. Retainer 246 is shown extending along a generally straight-line path between opposite ends. An intermediate portion of retainer 246 is connected, for example by way of a fastener, to an outer end of intermediate leg 450 so that the intermediate leg 250 and retainer 246 define a generally "T" shaped arrangement that captures the elongate routed components 6 within receptacles 260 with its inwardly facing surface(s).

Figure 12:
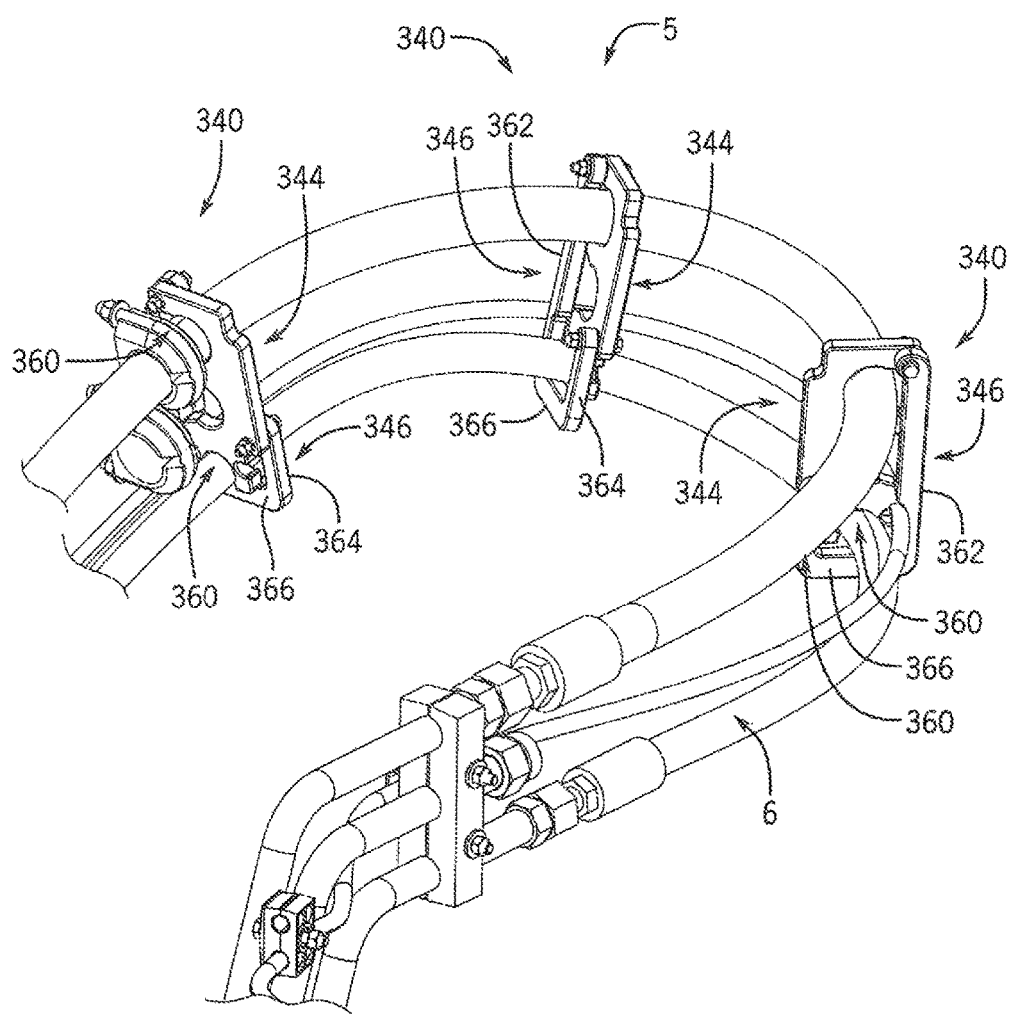
FIG. 12 is a pictorial view of other routing and securing assemblies with various elongate routed components of the vehicle being routed and secured.
Figure 13:
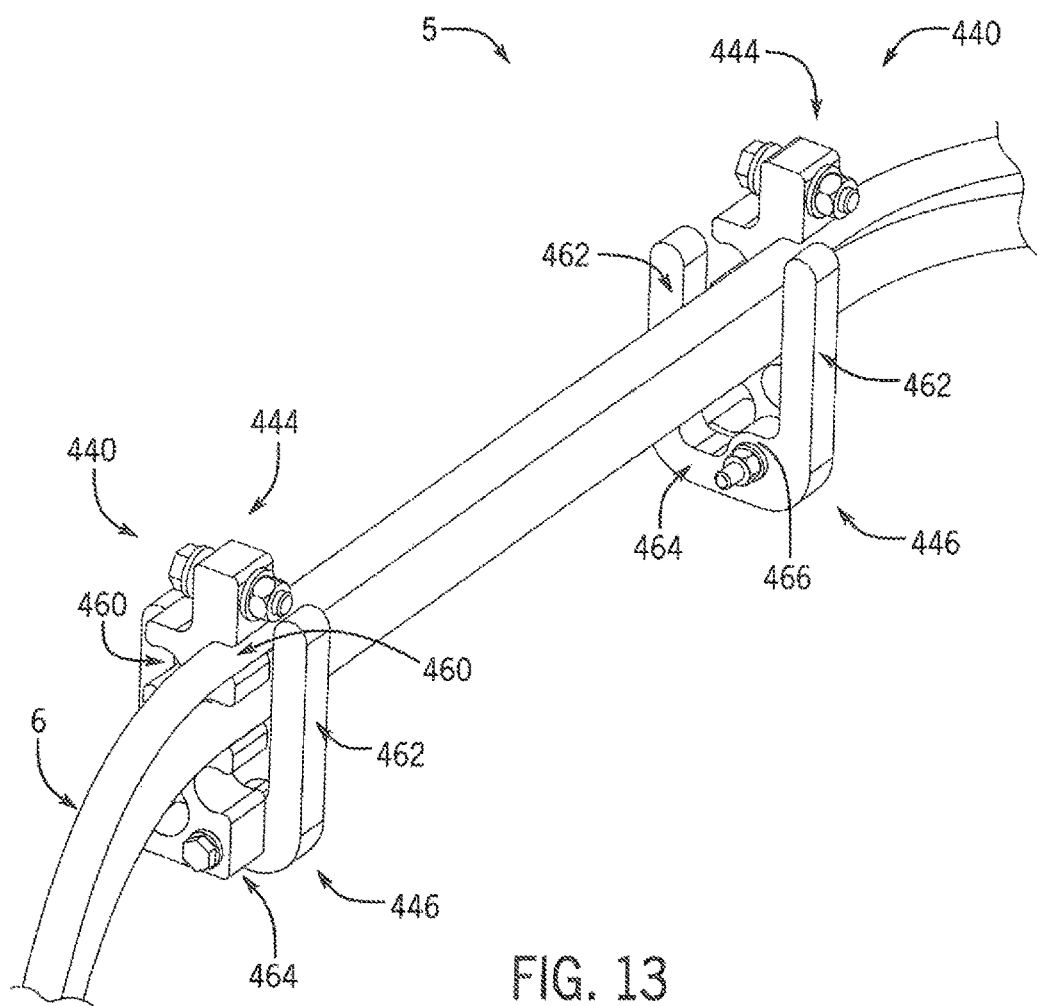
FIG. 13 is a pictorial view of other routing and securing assemblies with various elongate routed components of the vehicle being routed and secured.

Referring now to FIG. 12, routing and securing assembly 340 has base block 344 with concave receptacles 360 arranged to face outwardly in different directions relative to an outer perimeter of base block 344, shown here facing three different directions including two opposite directions and a third direction that is perpendicular with respect to both of the first two directions. Retainer 346 is shown with a "J" shaped configuration. Retainer 346 includes back leg 362 that is generally the same length as that of base block 344 and is attached at an upper end of the back leg 362 to an upper end of base block 344. Front leg 364 of retainer 346 is generally parallel to and shorter than back leg 362, extending only partway across base block 344 and is attached at an upper end of the front leg 364 to a lower portion of base block 344. Bottom leg 366 extends between and connects the back and front legs 362, 364, extending across an entire width of base block 344. In this way, retainer 346 extends or wraps around more than half of an outer perimeter of base block 344 as a "J" shaped barrier that captures the elongate routed components 6 within receptacles 360 with its inwardly facing surface(s).

Referring now to FIG. B, routing and securing assembly 440 has base, block 444 with concave, receptacles 460 arranged to face outwardly in different directions relative to an outer perimeter of base block 444, shown here facing two opposite directions and most visible at the left-most system 440. Base block 444 defines an upright beam with outwardly facing receptacles 460 at opposite sidewalls. Retainer 446 is shown with a "U" shaped configuration. Retainer 446 includes a pair of side legs 462, each of which is generally the same length as that of base block 444. Bottom leg 464 extends between and connects the side legs 462 to each other and extends across an entire width of base block 444 and is shown with mounting boss 466, most visible at the right-most system 440, which can receive a fastener to connect retainer 446 to base block 444. In this way, retainer 446 wraps around more than half of an outer perimeter of base block 444 as a "U" shaped barrier that captures the elongate routed components 6 within receptacles 460 with its inwardly facing surface(s).

Figure 14:
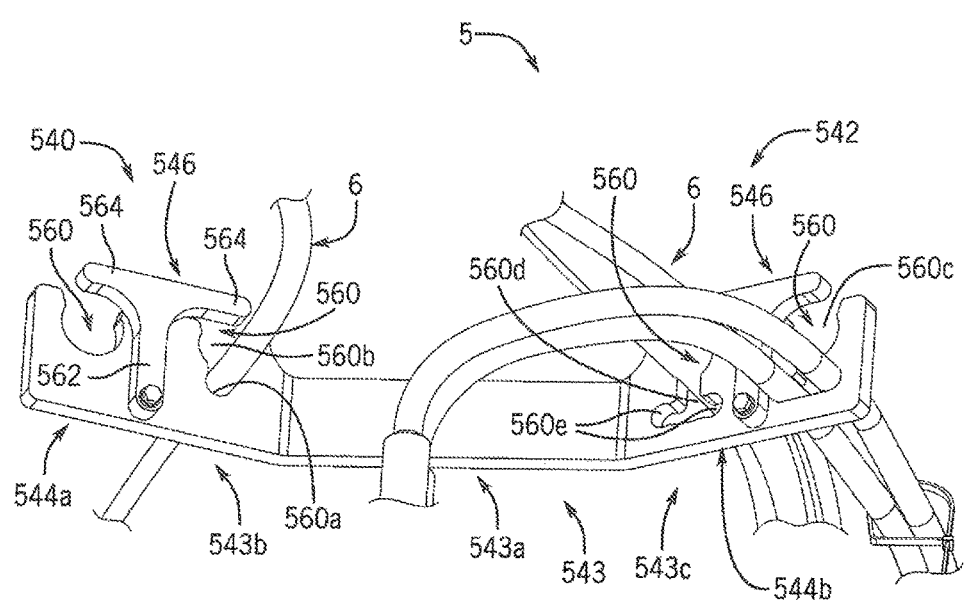
FIG. 14 is a pictorial view of other routing and securing assemblies with various elongate routed components of the vehicle being routed and secured.

Referring now to FIG. 14, system 5 has two routing and securing assemblies 540, 542 defined at opposite ends of bracket 543. Bracket 543 is shown here with intermediate portion 543a that extends between opposite ends 543b, 543c that define the base blocks 544a, 544b of assemblies 540, 542. Assembly 540 is, substantially the same as systems 40, 42 shown in FIGS. 2 and 9 and their components shown in FIGS. 4-5. In assembly 540, the receptacle 560 shown toward the left has a profile or perimeter shape that defines a major portion of a circle, similar to receptacle 60a of FIG. 4. Still referring to assembly 540, the receptacle shown toward the right has different profiles or perimeter shapes at different depths, with a lower portion 560a that is narrower than an upper portion 56b to define two stacked segments that can receive elongate routed components 6 of different sizes with smaller diameter components 6 able to fit deeper into the narrower bottom, segment of the receptacle 560. This is similar to receptacle 60b of FIG. 4. In assembly 542, both receptacles 560 are shown with relatively more complex profiles or perimeter shapes. These receptacles 560 have larger openings at their upper portions 560c, similar to upper portion 560b of assembly 540. The bottom of receptacle upper portion 560c opens into a narrower receptacle waist segment 560d. Two receptacle leg segments 560e extend in opposite directions from the bottom of receptacle waist segment 560d. In this way, the receptacle waist and leg segments 560d, 560e define an upside-down "I" shaped profile or perimeter shape of the receptacle 560 connected to and extending below the receptacle upper portion 560c. In each of assemblies 540, 542, retainer 546 is shown with a shaped configuration. Retainer 546 has, a stem portion 562 that is substantially the same height and extends across the base block 544a, 544I, with the stem portion 562 connected at its bottom end to a bottom end of base block 544a, 544h. At a top end of stem portion 562, a pair of arms 564 extend in opposite directions from stem portion 562. In this way, retainer 546 provides a shaped barrier that captures the elongate routed components 6 within receptacles 560 with its inwardly facing surface(s).

Many changes and modifications could be made to the invention without departing from the spirit thereof. The scope of these changes will become apparent from the appended claims.

We claim:

1. A system for routing and securing elongate routed components of a vehicle, the system comprising:
   a first base block disposed in a first plane, the first base block including an outer edge having a plurality of sides projecting in the first plane, wherein the outer edge defines first and second concave receptacles, wherein the first and second concave receptacles are configured to receive first and second elongate routed components, respectively, passing through the first plane and into a second plane adjacent to the first plane;
   a first retainer disposed in the second plane, the first retainer having a retainer base providing an arm, wherein the first retainer is disposed in the second plane so that at least one of the retainer base and the arm is configured to secure the first elongate routed component to the first concave receptacle and at least one of the retainer base and the arm is configured to secure the second elongate routed component to the second concave receptacle;
   a second base block disposed in a third plane, the second base block including an outer edge having a plurality of sides projecting in the third plane, wherein the outer edge defines first and second concave receptacles, wherein the first and second concave receptacles of the second base block are configured to receive the first and second elongate routed components, respectively, passing through the third plane and into a fourth plane adjacent to the third plane;
   a second retainer disposed in the fourth plane, the second retainer having a retainer base providing an arm, wherein the second retainer is disposed in the fourth plane so that at least one of the retainer base and the arm of the second retainer is configured to secure the first elongate routed component to the first concave receptacle of the second base block and at least one of the retainer base and the arm of the second retainer is configured to secure the second elongate routed component to the second concave receptacle of the second base block; and
   a mounting bracket interconnecting the first and second base blocks;
   wherein the mounting bracket is joined to the first base block by a fastener.

2. The system of claim 1, wherein the first and second concave receptacles of the first base block are adjacent to one another on a first side of the first base block, and wherein the retainer base of the first retainer is configured to secure the first and second elongate routed components to the first and second concave receptacles, respectively, of the first base block.

3. The system of claim 1, wherein each of the first and second concave receptacles of the first base block urge inward at an ingress region.

4. The system of claim 1, wherein the first base block is joined to the first retainer by a fastener.

5. The system of claim 4, wherein the first base block includes a base block aperture and the first retainer includes a retainer aperture, and wherein the fastener includes a bolt passing through each of the base block aperture and the retainer aperture with a nut receiving the bolt.

6. The system of claim 1, wherein the first base block includes a base block aperture and the mounting bracket includes a mounting bracket aperture, and wherein the fastener includes a bolt passing through each of the first base block aperture and the mounting bracket aperture with a nut receiving the bolt.

7. A system for routing and securing elongate routed components of a vehicle, the system comprising:
   a base block disposed in a first plane, the base block including an outer edge having a plurality of sides projecting in the first plane, wherein the outer edge defines first and second concave receptacles, wherein the first and second concave receptacles are configured to receive first and second elongate routed components, respectively, passing through the first plane and into a second plane adjacent to the first plane; and
   a retainer disposed in the second plane, the retainer having a retainer base providing an arm, wherein the retainer is disposed in the second plane so that at least one of the retainer base and the arm is configured to secure the first elongate routed component to the first concave receptacle and at least one of the retainer base and the arm is configured to secure the second elongate routed component to the second concave receptacle;
   wherein:
   the first and second concave receptacles are adjacent to one another on a first side;
   the outer edge which defines the second concave receptacle further defines a third concave receptacle within the second concave receptacle, the third concave receptacle having a smaller dimension than the second concave receptacle; and
   the third concave receptacle is configured to receive a third elongate routed component passing through the first plane and into the second plane.

8. The system of claim 7, wherein the outer edge further defines fourth and fifth concave receptacles adjacent to one another on a second side projecting oppositely from the first side, wherein the outer edge which defines the fifth concave receptacle further defines a sixth concave receptacle within the fifth concave receptacle, the sixth concave receptacle having a smaller dimension than the fifth concave receptacle, and wherein the fourth, fifth and sixth concave receptacles are configured to receive fourth, fifth and sixth elongate routed components, respectively, passing through the first plane and into the second plane.

9. The system of claim 8, wherein the outer edge further defines a seventh concave receptacle on a third side, and wherein the seventh concave receptacle is configured to receive a seventh elongate routed component passing through the first plane and into the second plane.

10. The system of claim 9, wherein the arm is a first arm, and the retainer base further provides a second arm, and wherein the first arm is configured to secure the first, second and third elongate routed components to the first, second and third concave receptacles, respectively, the second arm is configured to secure the fourth, fifth and sixth elongate routed components to the fourth, fifth and sixth concave receptacles, respectively, and the retainer base is configured to secure the seventh elongate routed component to the seventh concave receptacle.

11. A system for routing and securing elongate routed components of a vehicle, the system comprising:
a first base block disposed in a first plane, the first base block including an outer edge having a plurality of sides projecting in the first plane, wherein the outer edge defines first and second concave receptacles, wherein the first and second concave receptacles are configured to receive first and second elongate routed components, respectively, passing through the first plane and into a second plane adjacent to the first plane;
a first retainer disposed in the second plane, the first retainer having a retainer base providing an arm, wherein the first retainer is disposed in the second plane so that at least one of the retainer base and the arm is configured to secure the first elongate routed component to the first concave receptacle and at least one of the retainer base and the arm is configured to secure the second elongate routed component to the second concave receptacle;
a mounting bracket joined to the first base block by a fastener; and
a second base block and a second retainer;
wherein the first base block and the second base block are joined by the mounting bracket.

12. A system for routing and securing elongate routed components of a vehicle, the system comprising:
a routing and securing assembly that includes:
a first base block arranged to engage an elongate routed component that defines a longitudinal axis to restrict movement of the elongate routed component against movement in a first direction, wherein the first base block is provided in a first position relative to the longitudinal axis of the elongate routed component and the first base block includes:
an outer edge that extends about a base block perimeter of the first base block; and
at least one receptacle that defines a concave portion of the base block perimeter and wherein the at least one receptacle is configured to receive and hold the elongate routed component to restrict movement of the elongate routed component against movement in the first direction;
a first retainer supported by the first base block and arranged with respect to the elongate routed component to restrict movement of the elongate routed component against movement in a second direction, wherein the first retainer is provided in a second position relative to the longitudinal axis of the elongate routed component; and
a mounting bracket having first and second apertures, the first aperture adapted for receiving a corresponding vehicle fastener for selectively connecting the mounting bracket to the vehicle; and
a block fastener receivable in the second aperture of the mounting bracket for selectively connecting the mounting bracket to the first base block.

13. The system of claim 12, wherein the first base block and first retainer are arranged in different planes and in an at least partially overlapping relationship with respect to each other.

14. The system of claim 13, wherein the at least one receptacle includes multiple receptacles that are spaced from each other about the first base block to hold multiple elongate routed components.

15. The system of claim 14, wherein first retainer is arranged to the multiple elongate routed components to prevent withdrawal of the elongate routed components from the multiple receptacles.

16. The system of claim 12, wherein the first base block and first retainer are connected to each other to provide a face-to-face engagement of respective overlapping portions of the first base block and first retainer.

17. A system for routing and securing elongate routed components of a vehicle, the system comprising:
multiple routing and securing assemblies that are spaced from each other relative to a vehicle chassis for routing and securing multiple elongate routed components that extend between different locations relative to the vehicle chassis, wherein each of the multiple routing and securing assemblies includes:
a base block with an outer perimeter and multiple receptacles configured to receive and support the multiple elongate routed components, wherein each of the multiple receptacles defines an opening that faces outwardly with respect to the base block;
a retainer connected to the base block at a connection location and having at least one surface that faces toward the base block, the base block and retainer being transversely staggered with respect to each other so that the connection location is defined at respective overlapping portions of the base block and the retainer;
a mounting bracket interconnecting the base block of a first of the multiple routing and securing assemblies and the base block of a second of the multiple routing and securing assemblies, the mounting bracket including first and second apertures therethrough;
a first fastener receivable in the first aperture of the mounting bracket for selectively connecting the mounting bracket to the base block of the first of the multiple routing and securing assemblies; and
a second fastener receivable in the second aperture of the mounting bracket for selectively connecting the mounting bracket to the second of the multiple routing and securing assemblies.

18. The system of claim 17, wherein portions of the retainer extends about multiple sides of the base block.

* * * * *